US012685258B2

(12) United States Patent
Wei et al.

(10) Patent No.: US 12,685,258 B2
(45) Date of Patent: Jul. 21, 2026

(54) MOWING DECK ASSEMBLY WITH ONBOARD CONTROLLER AND OUTDOOR POWER MACHINE WITH MOWING DECK ASSEMBLY

(71) Applicant: Greenworks (Jiangsu) Co. Ltd., Changzhou (CN)

(72) Inventors: Qunli Wei, Changzhou (CN); Qinghua Shi, Changzhou (CN); Dongdong Shi, Changzhou (CN)

(73) Assignee: GREENWORKS (JIANGSU) CO. LTD. (CN)

( * ) Notice: Subject to any disclaimer, the term of this patent is extended or adjusted under 35 U.S.C. 154(b) by 350 days.

(21) Appl. No.: 18/558,573

(22) PCT Filed: Sep. 6, 2022

(86) PCT No.: PCT/CN2022/117395
§ 371 (c)(1),
(2) Date: Nov. 2, 2023

(87) PCT Pub. No.: WO2024/050704
PCT Pub. Date: Mar. 14, 2024

(65) Prior Publication Data
US 2025/0098576 A1 Mar. 27, 2025

(51) Int. Cl.
*A01D 34/78* (2006.01)
*A01D 34/00* (2006.01)
(Continued)

(52) U.S. Cl.
CPC ........... *A01D 34/78* (2013.01); *A01D 34/006* (2013.01); *A01D 34/66* (2013.01); *A01D 34/81* (2013.01); *A01D 2101/00* (2013.01)

(58) Field of Classification Search
CPC ...... A01D 34/00–34/905; A01D 34/78; A01D 34/66; A01D 34/006; A01D 34/81; A01D 2101/00
See application file for complete search history.

(56) References Cited

U.S. PATENT DOCUMENTS 5,987,863 A * 11/1999 Busboom ............. A01D 34/005
56/320.1
7,093,415 B2 * 8/2006 Kallevig ............. A01D 34/005
56/6
(Continued)

FOREIGN PATENT DOCUMENTS

CN 212696648 8/2020
CN 114929009 8/2022

OTHER PUBLICATIONS

International Search Report and Written Opinion of International Patent Application No. PCT/CN2022/117395 issued on Apr. 14, 2023.

*Primary Examiner* — Joseph M Rocca
*Assistant Examiner* — Madeline I Runco
(74) *Attorney, Agent, or Firm* — Shumaker, Loop & Kendrick, LLP; Brandon C. Trego

(57) ABSTRACT

A mowing deck assembly for an outdoor power machine includes: a mowing deck defining an open-bottomed housing, including a top panel and a peripheral wall structure; two or more electric blade motors mounted to the mowing deck; two or more mowing blades, each of the two or more mowing blades being coupled to each of the electric blade motor mounted to the deck; and an electronic blade motor controller mounted to the deck and electrically connected to each of the electric blade motors.

18 Claims, 13 Drawing Sheets

(51) Int. Cl.
    *A01D 34/66*        (2006.01)
    *A01D 34/81*        (2006.01)
    *A01D 101/00*      (2006.01)

(56)                References Cited

U.S. PATENT DOCUMENTS

| | | | | |
|---|---|---|---|---|
| 8,171,709 | B1 * | 5/2012 | Bedford | A01D 34/71 |
| | | | | 56/320.2 |
| 8,191,343 | B1 | 6/2012 | Hauser et al. | |
| 9,210,839 | B2 * | 12/2015 | Schygge | B60L 50/60 |
| 10,721,863 | B2 * | 7/2020 | Uchimi | A01D 34/78 |
| 11,382,264 | B2 * | 7/2022 | Ito | A01D 34/81 |
| 11,437,936 | B2 * | 9/2022 | Schulenberg | H02P 5/52 |
| 11,712,001 | B2 * | 8/2023 | Zeiler | A01D 34/82 |
| | | | | 56/17.5 |
| 2004/0237492 | A1 | 12/2004 | Samejima et al. | |
| 2010/0269474 | A1 * | 10/2010 | Hansen | A01D 34/81 |
| | | | | 56/16.7 |
| 2010/0275564 | A1 * | 11/2010 | Baetica | A01D 34/37 |
| | | | | 429/96 |
| 2014/0331634 | A1 | 11/2014 | Korthals et al. | |
| 2018/0146620 | A1 * | 5/2018 | Uchimi | A01D 34/81 |
| 2018/0192580 | A1 | 7/2018 | Zeiler et al. | |
| 2018/0235149 | A1 * | 8/2018 | Ito | A01D 34/73 |
| 2020/0113133 | A1 * | 4/2020 | Zeiler | A01D 34/78 |
| 2021/0105939 | A1 * | 4/2021 | Zeiler | A01D 34/82 |
| 2022/0369546 | A1 * | 11/2022 | Docken | A01D 34/74 |
| 2023/0105559 | A1 * | 4/2023 | Wang | B60L 53/62 |
| | | | | 180/68.5 |
| 2023/0180657 | A1 * | 6/2023 | Zeiler | A01D 69/02 |
| | | | | 56/13.6 |

* cited by examiner

MOWING DECK ASSEMBLY WITH ONBOARD CONTROLLER AND OUTDOOR POWER MACHINE WITH MOWING DECK ASSEMBLY

BACKGROUND OF THE INVENTION

This invention relates generally to outdoor power equipment, and more particularly to implements for self-propelled outdoor power machines.

BACKGROUND

Various types of outdoor power machines are known. Examples of common machines include lawn mowers and lawn tractors. Some outdoor power machines have an operator seat and are considered "ride-on", "riders", or "riding" machines. Others accommodate an operator in a standing position, described as a "stand-on" or "stander" machine.

Some known outdoor power machines are battery powered. They include a battery pack which provides electrical power for the primary operating components of the machine, such as the drive wheels and mower deck or other powered implements. The battery pack also provides electrical power for controls, displays, and accessories of the machine.

One problem with prior art outdoor power machines is that multiple-blade decks typically require multiple electrical connections on separate chassis-mounted blade motor controllers.

BRIEF SUMMARY OF THE INVENTION

This problem is addressed by a mowing deck assembly having an onboard blade motor controller.

According to one aspect of the technology described herein, a mowing deck assembly for an outdoor power machine includes: a mowing deck defining an open-bottomed housing, including a top panel and a peripheral wall structure; two or more electric blade motors mounted to the mowing deck; two or more mowing blades, each of the two or more mowing blades being coupled to each of the electric blade motor mounted to the deck; and an electronic blade motor controller mounted to the deck and electrically connected to each of the electric blade motors.

According to another aspect of the technology described herein, an outdoor power machine includes: a chassis; two or more drive wheel assemblies mounted to the chassis, each drive wheel assembly coupled to an electric motor; an electrical power pack configured to supply electric energy to the electric motors; two or more steer wheels pivotally mounted to the chassis; a mowing deck assembly connected to the chassis; the mowing deck assembly including: a mowing deck defining an open-bottomed housing, including a top panel and a peripheral wall structure; two or more electric blade motors mounted to the mowing deck; two or more mowing blades, each of the two or more mowing blades being coupled to each of the electric blade motor mounted to the deck; and an electronic blade motor controller mounted to the deck and electrically connected to each of the electric blade motors.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
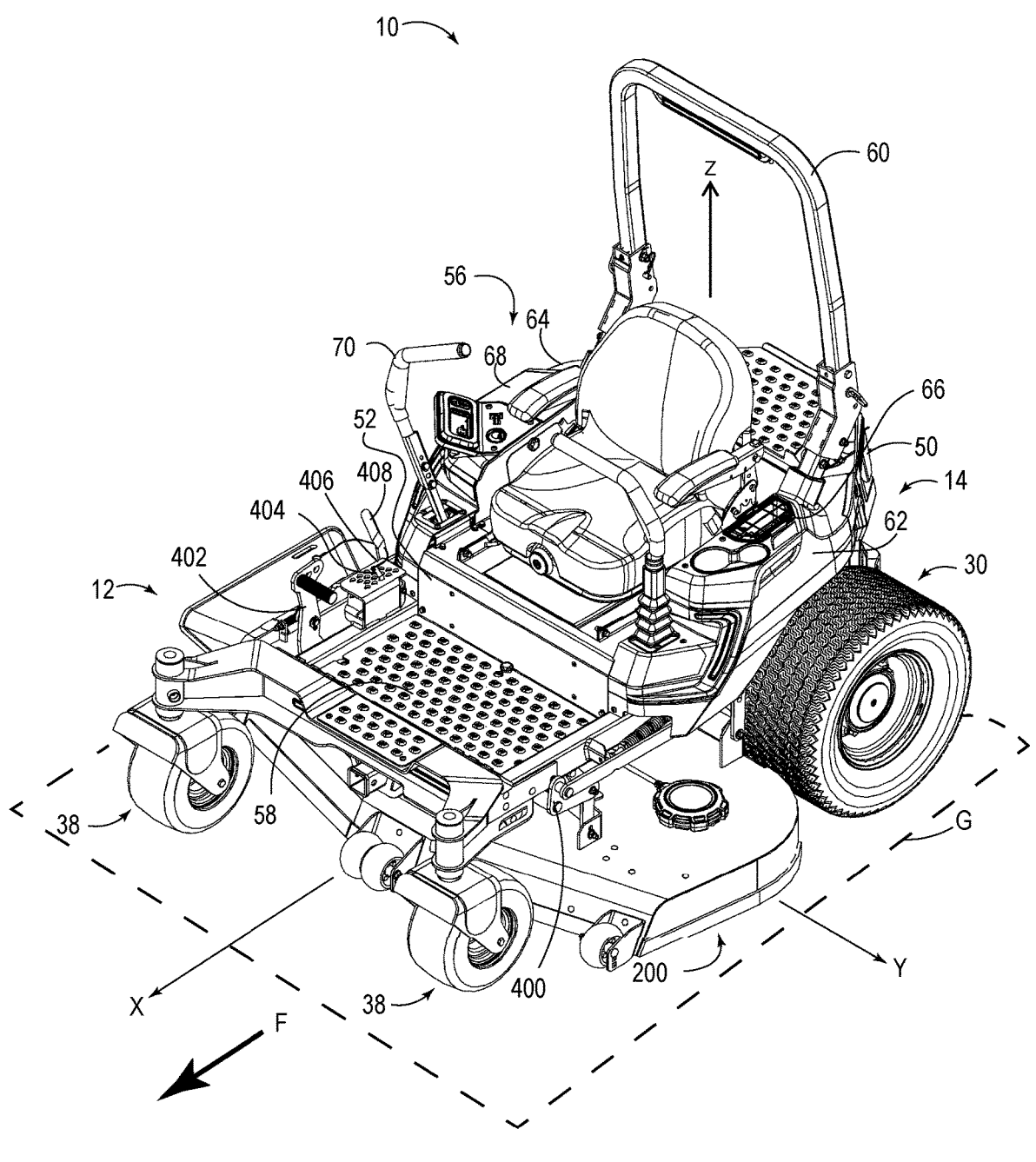
FIG. 1 is a front perspective view of an exemplary ride-on zero-turn outdoor power machine.
Figure 2:
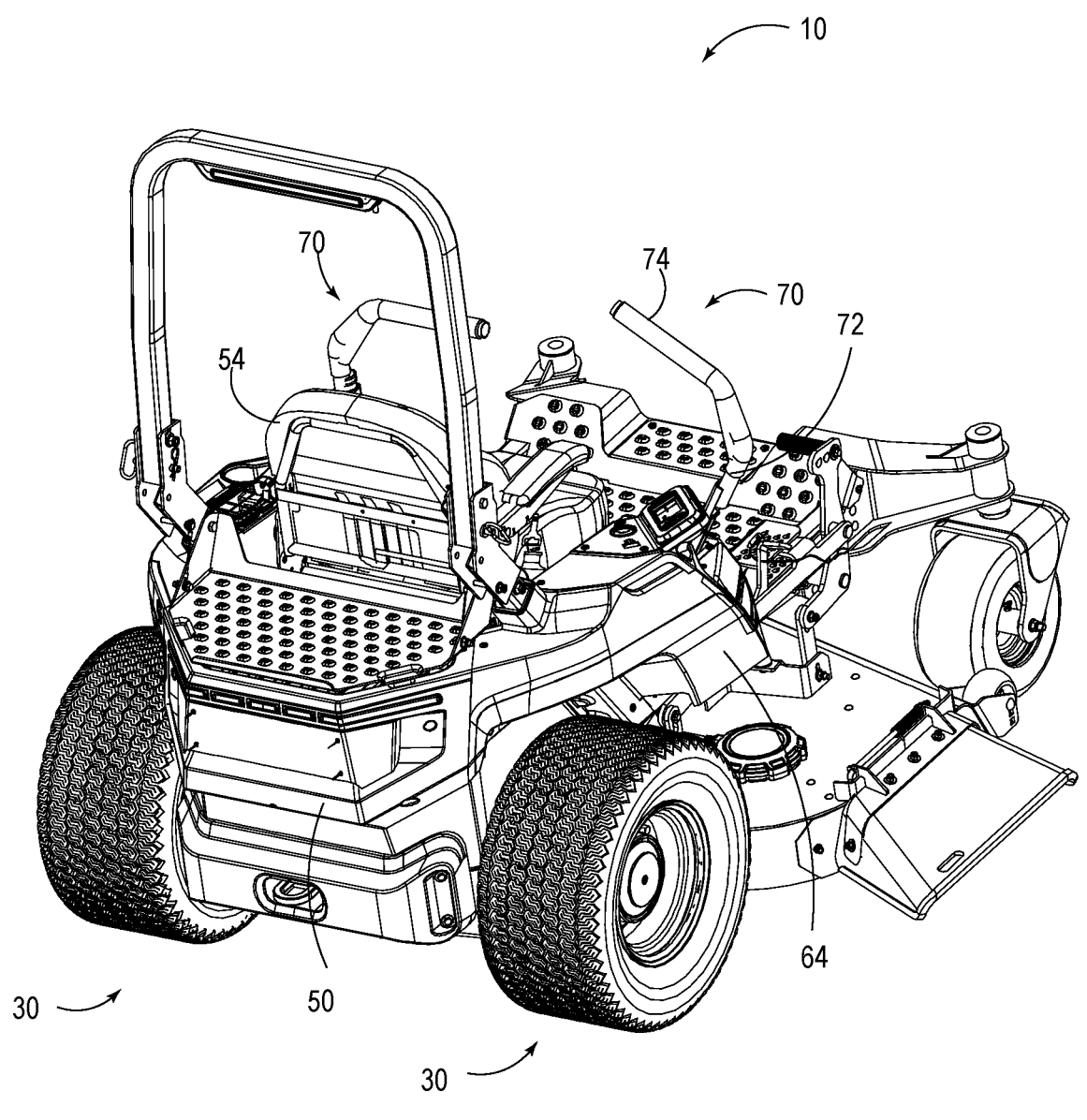
FIG. 2 is a rear perspective view of the machine of FIG. 1.
Figure 3:
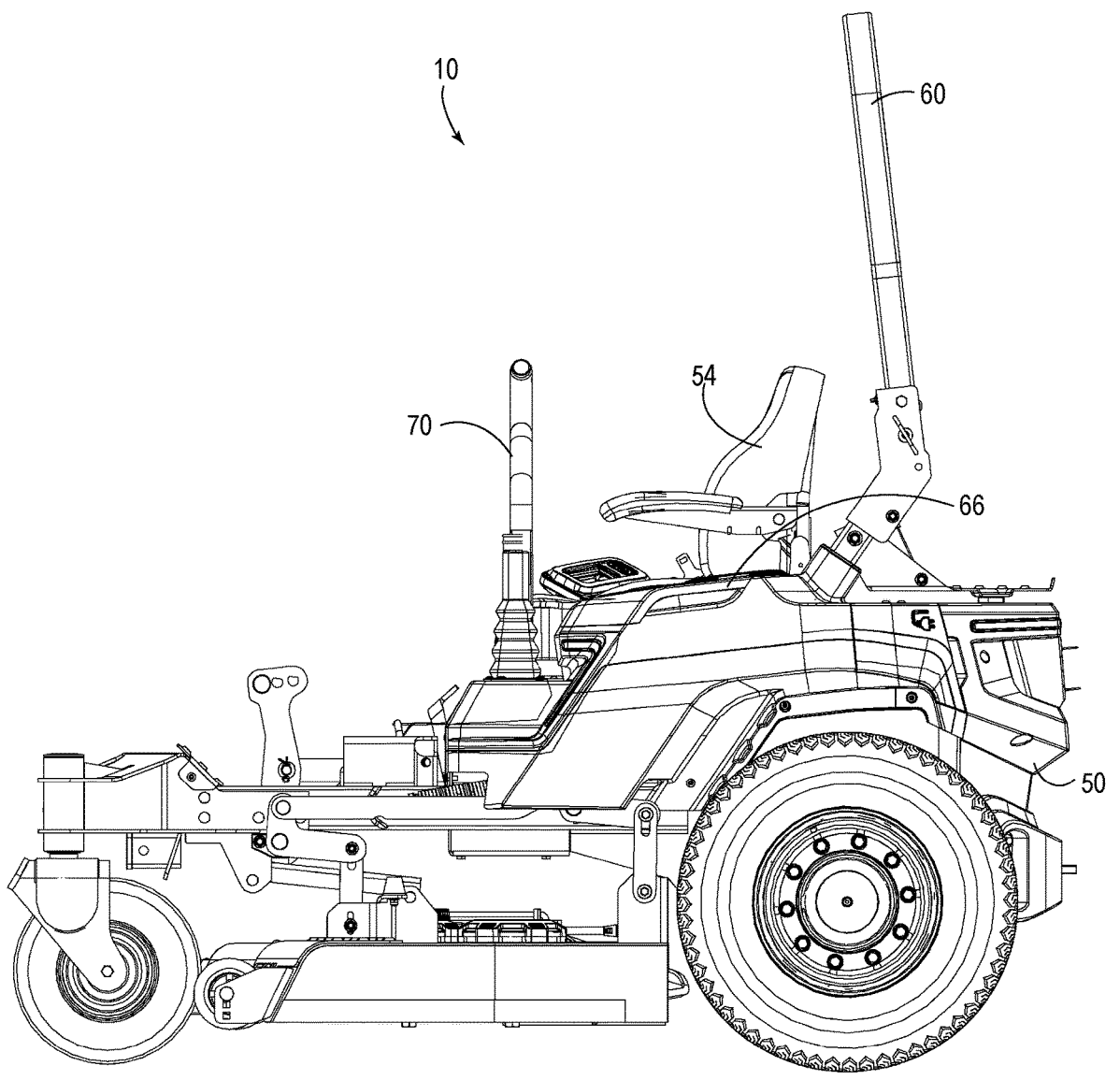
FIG. 3 is a side elevation view of the machine of FIG. 1.
Figure 4:
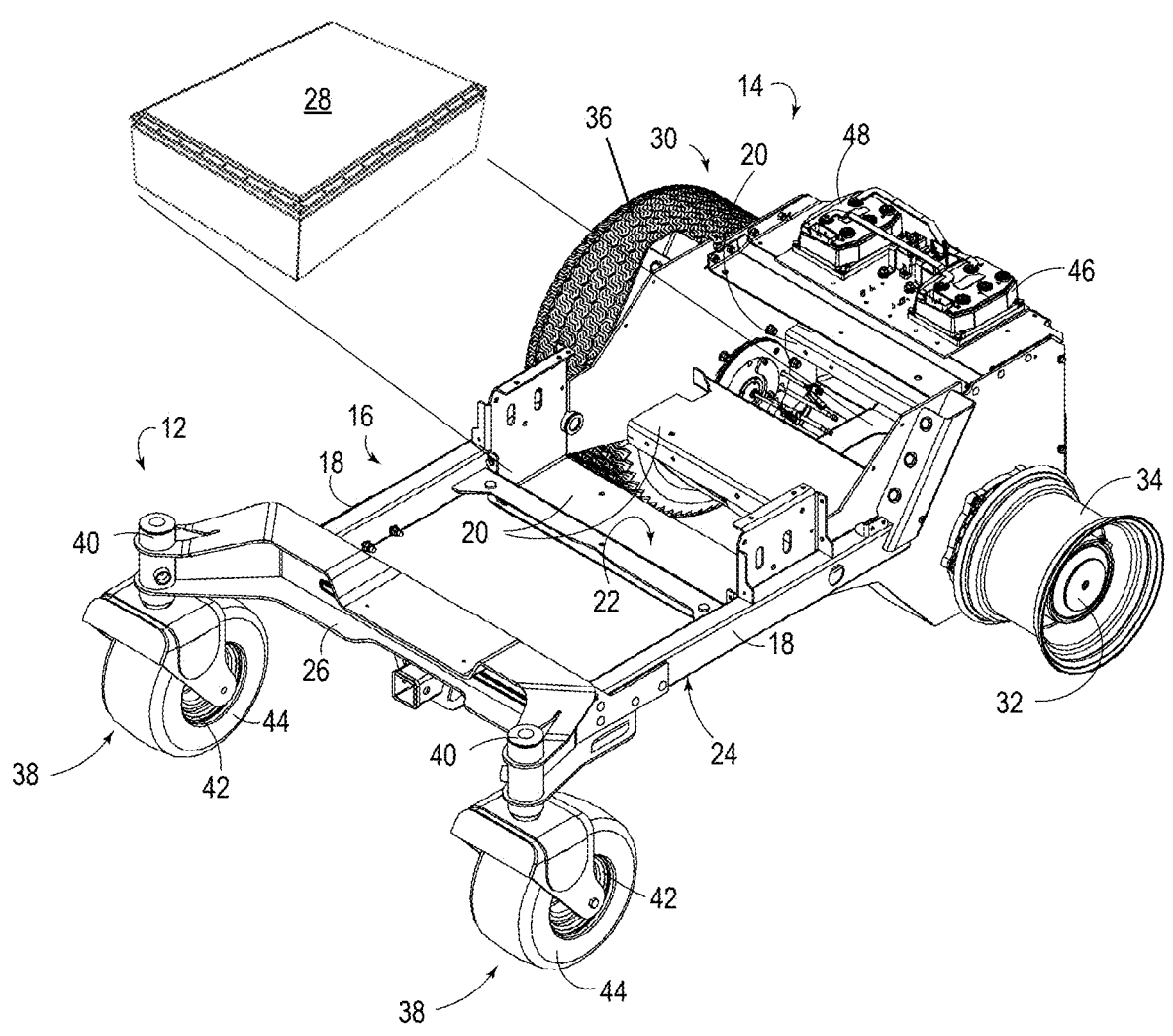
FIG. 4 is a perspective view of a chassis of the machine of FIG. 1.
Figure 5:
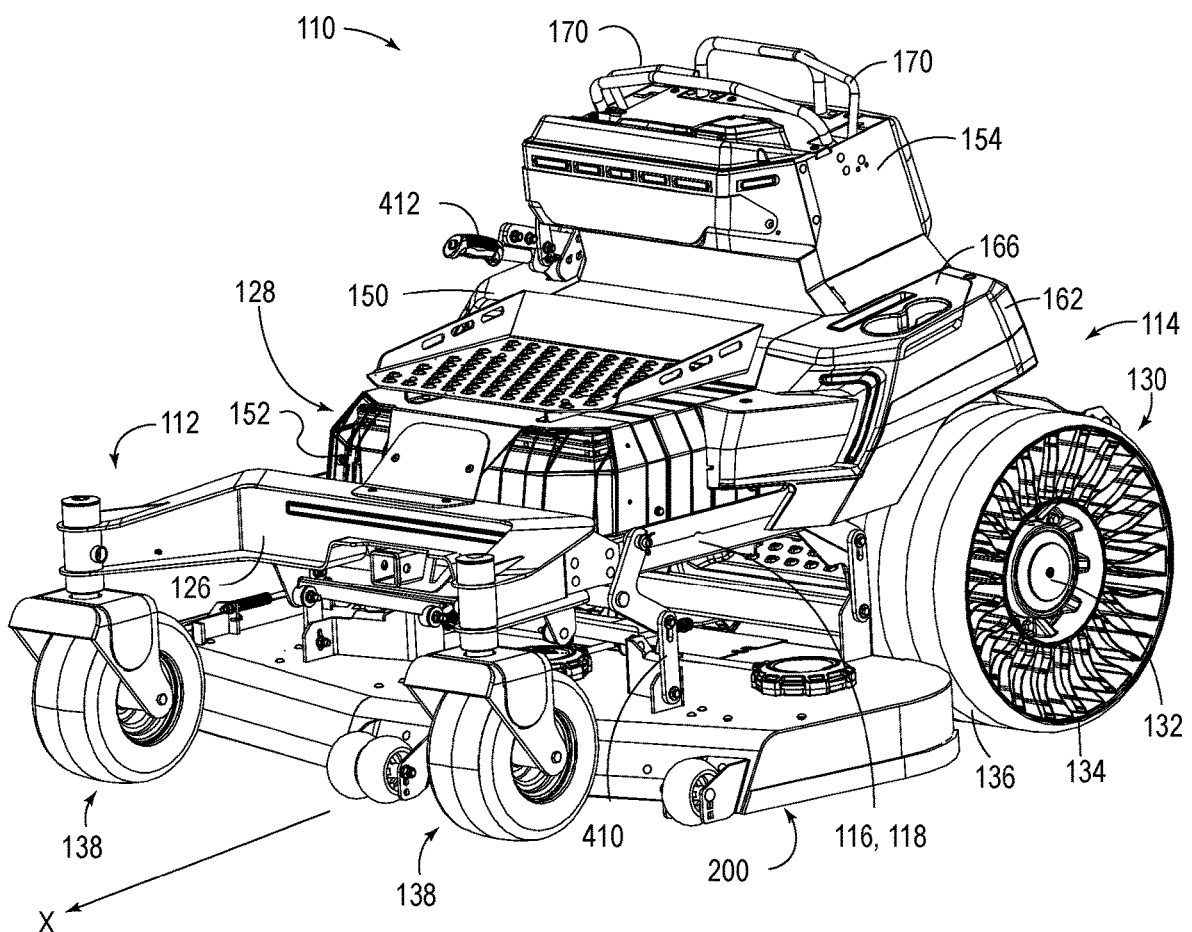
FIG. 5 is a front perspective view of an exemplary stand-on zero-turn outdoor power machine.
Figure 6:
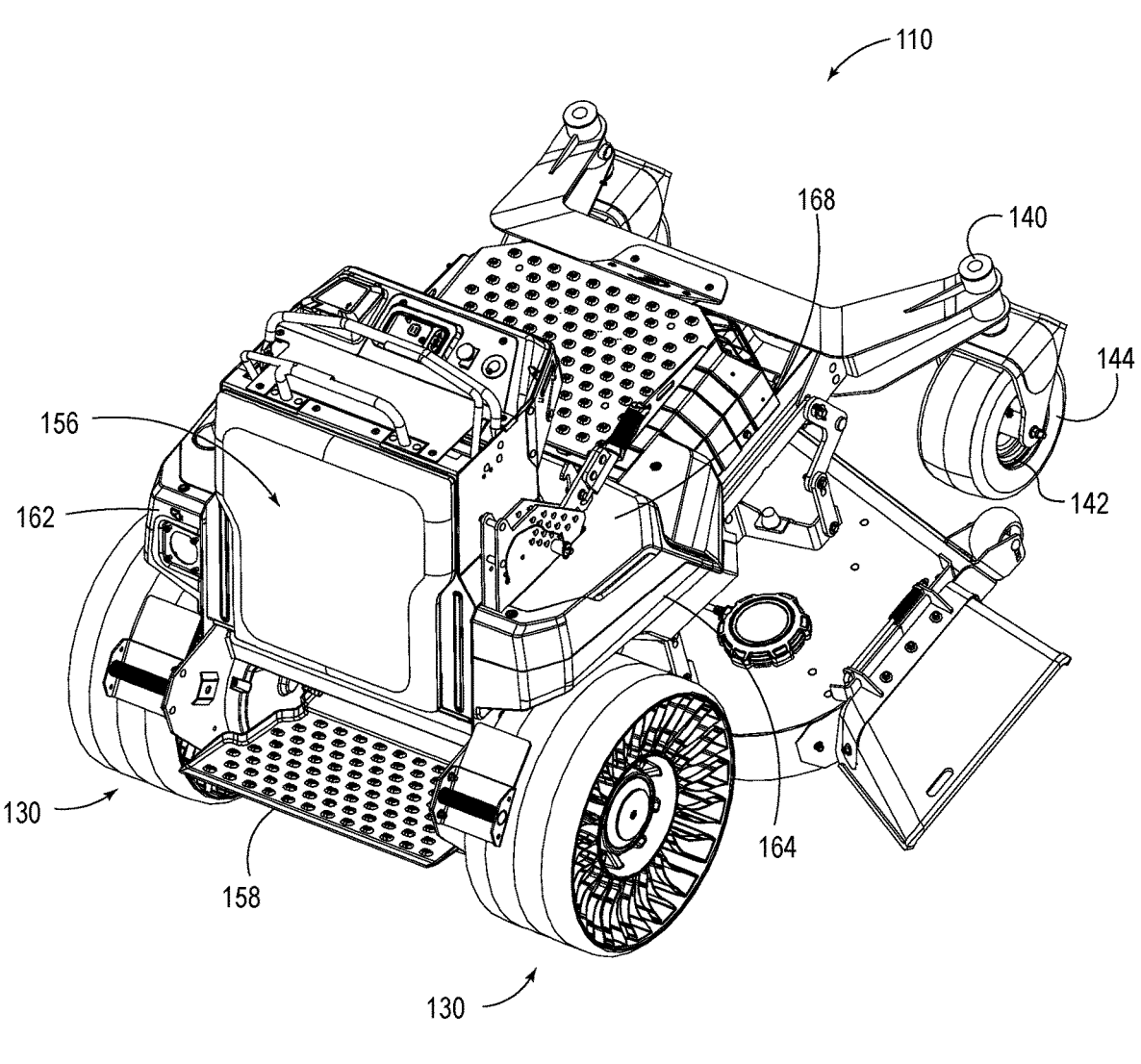
FIG. 6 is a rear perspective view of the machine of FIG. 5.
Figure 7:
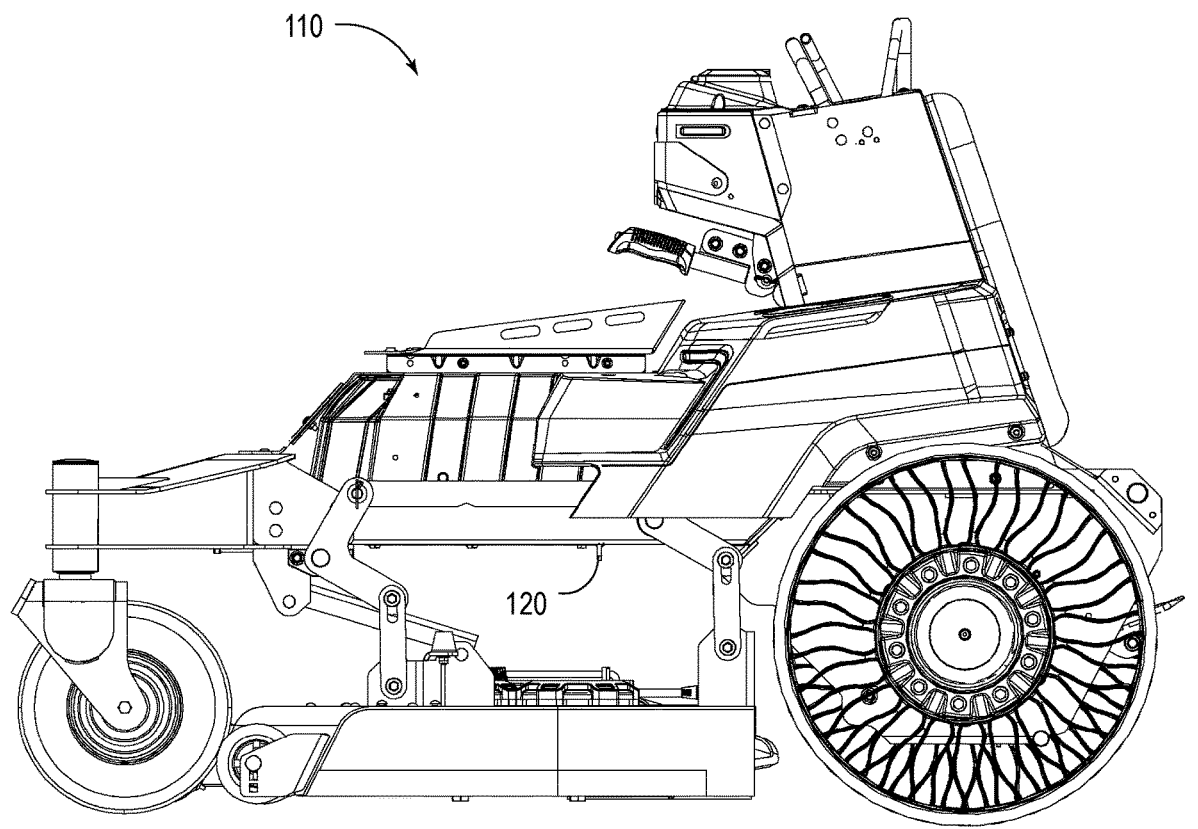
FIG. 7 is a side elevation view of the machine of FIG. 5.
Figure 8:
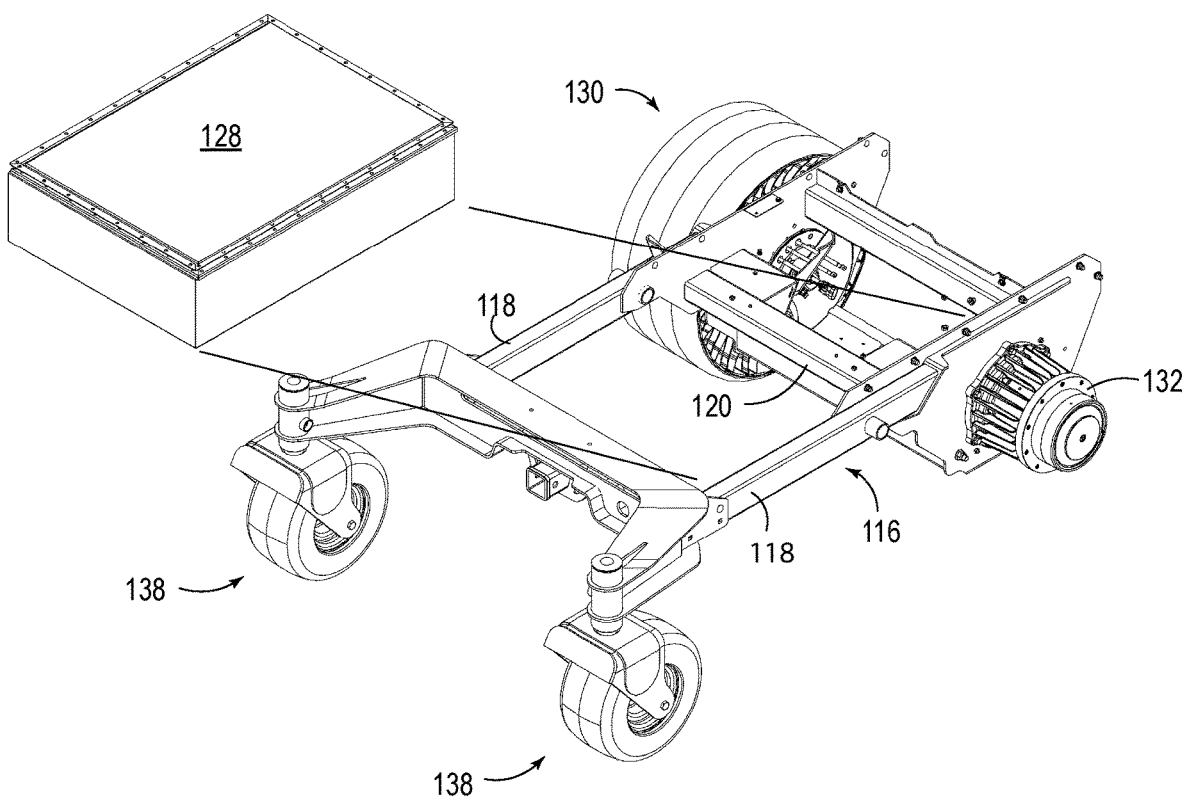
FIG. 8 is a perspective view of a chassis of the machine of FIG. 5.
Figure 9:
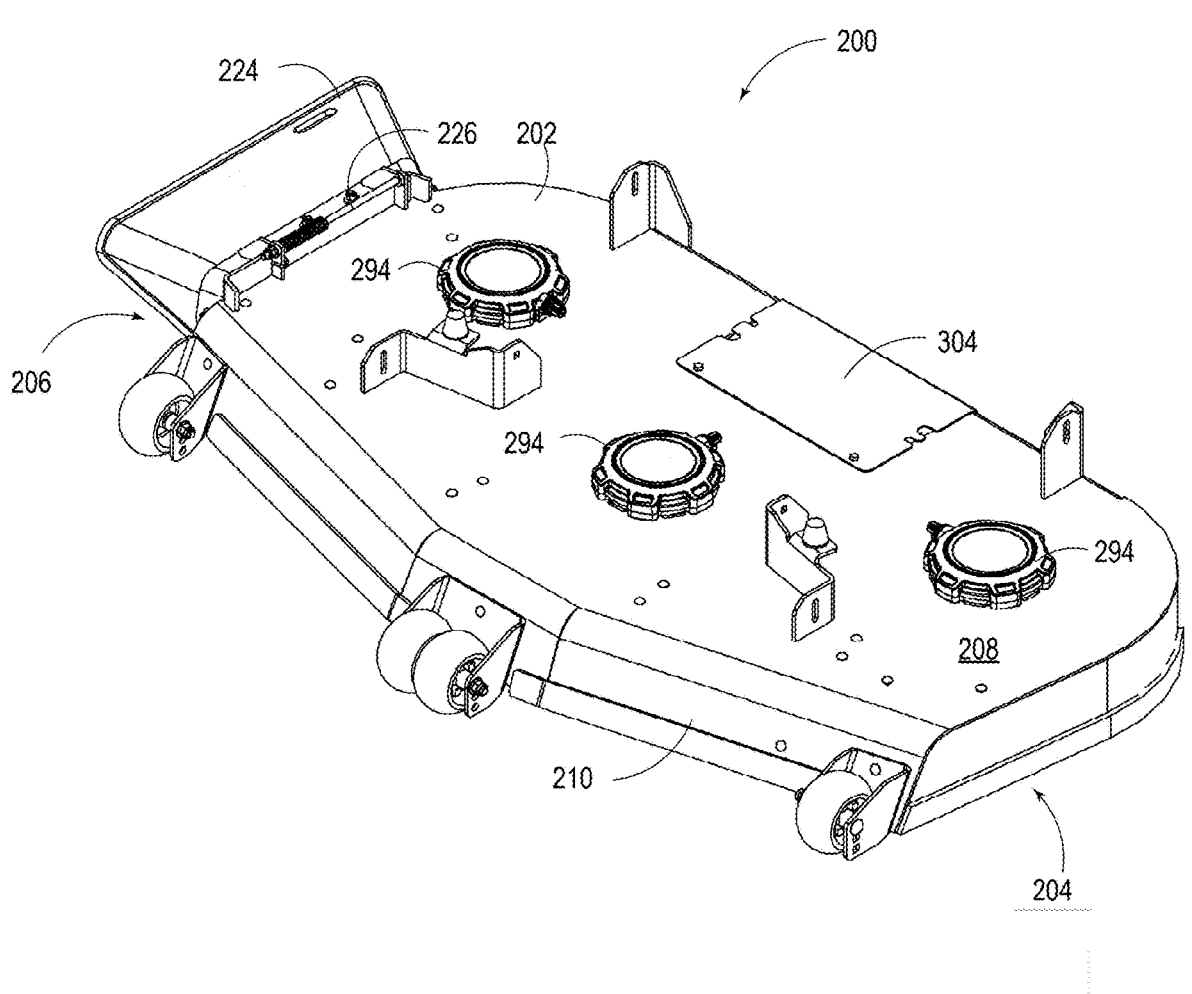
FIG. 9 is a perspective view of an exemplary mowing deck assembly.
Figure 10:
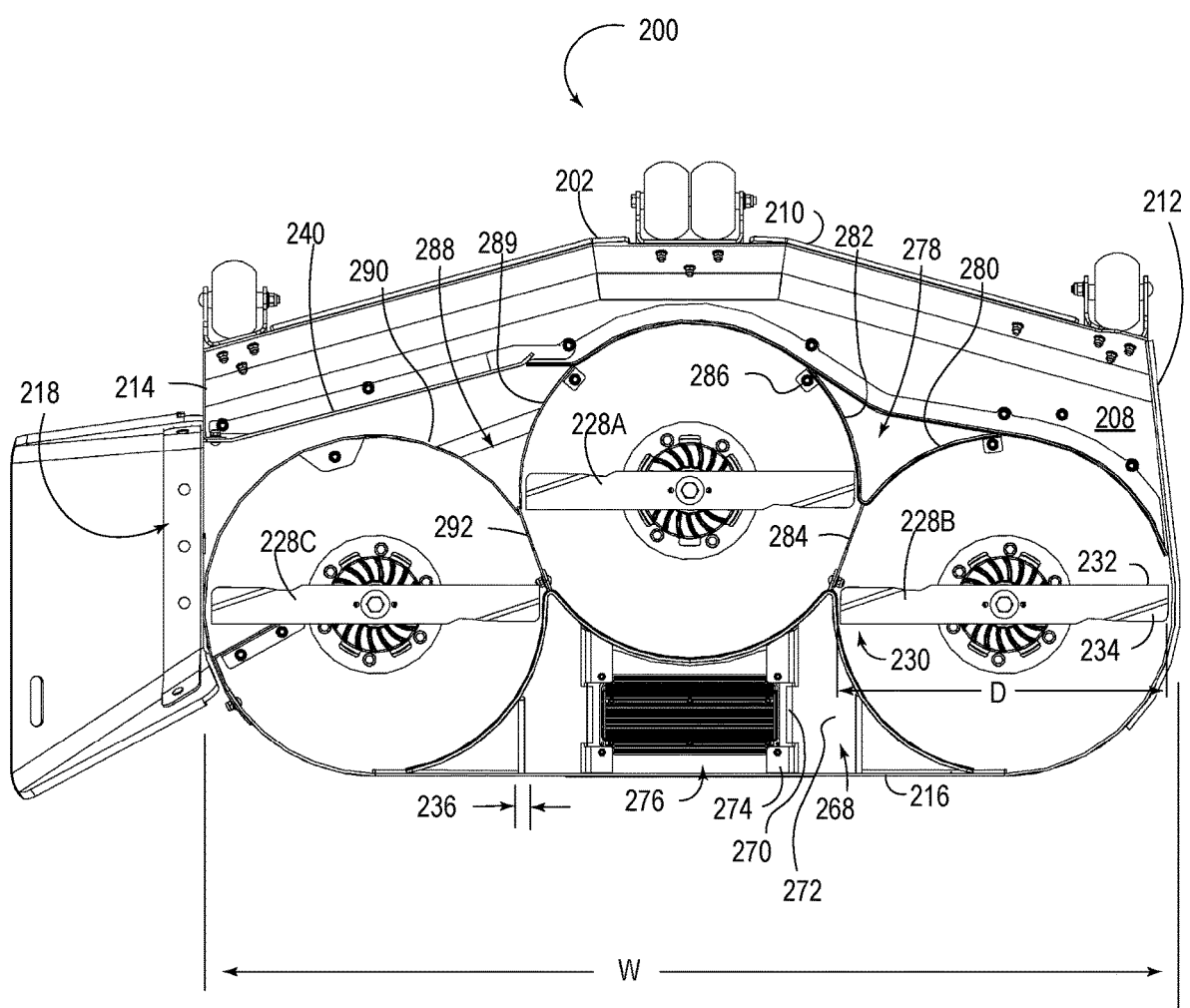
FIG. 10 is a bottom plan view of the mowing deck assembly of FIG. 9.

Referring to the drawings wherein identical reference numerals denote the same elements throughout the various views, FIGS. 1-4 show a representative embodiment of an outdoor power machine 10. The machine 10 extends along an axial direction (arrow "X") between a front end 12 and a rear end 14. The points of contact of the wheels of the machine 10 collectively define a ground plane "G".

It is noted that, as used herein, the terms "axial" and "longitudinal" both refer to a direction parallel to the axis X, while "vertical" refers to a direction perpendicular to the axial direction and to the ground plane G (see arrow "Z" in FIG. 1) and "lateral" refers to a direction mutually perpendicular to the axial and vertical directions (see arrow "Y" in FIG. 1). A primary forward direction of ground travel is shown by the arrow "F" in FIG. 1. These directional terms are used merely for convenience in description and do not require a particular orientation of the structures described thereby.

In the illustrated example, the outdoor power machine 10 is a zero-turn-radius type machine, alternatively referred to as a "zero-turn" machine. This type of machine is capable of changing its direction of travel (heading) without significant forward or backward movement. This is accomplished by differential rotation of drive wheels on opposite sides of the machine 10 to produce a yawing motion. For example, rotating the right-side wheel forward and simultaneously rotating the left-side wheel backward at the same wheel speed (RPM) will cause the machine 10 to yaw (turn) to the left without moving forwards or backwards. Related steering effects may be obtained by rotating drive wheels on opposite sides in different directions and different wheel speeds, by holding one wheel stationary while driving the opposite-side wheel in a chosen direction, or by rotating the wheels on opposite sides in the same direction at different wheel speeds.

The principles described herein are also applicable to a non zero-turn mower (not shown) using a conventional steering linkage to pivot (steer) some or all of the wheels.

In the example shown in FIGS. 1-4, the machine 10 is a ride-on machine (alternatively referred to as a "rider" or "riding machine").

The machine 10 has a chassis 16 (FIG. 4) which provides structural support as well as mounting locations for the various components of the machine 10. Any material with adequate structural strength may be used to construct the chassis 16. Examples of suitable materials include metals such as aluminum and steel and their alloys. The chassis 16 may be monolithic or may be built up from smaller components, e.g., via fasteners, adhesives, or welding.

The chassis 16 includes a pair of spaced-apart main frame rails 18 extending in a longitudinal direction from the front end 12 of the machine 10 to the rear end 14 of the machine 10. Cross-members 20 interconnect the main frame rails 18. Top surfaces 22 of the cross-members 20 are positioned even with or lower than the bottom surfaces 24 of the main frame rails 18.

A front axle assembly 26 interconnects the main frame rails 18 at the front end 12 of the machine 10.

The machine 10 is equipped with an electric power pack 28 suitable for storing and discharging electrical energy. In the illustrated example, the electric power pack 28 is a storage battery including one or more chemical cells, for example lithium ion cells. Other liquid battery chemistries may be substituted, as well as solid state batteries, capacitors, or similar devices which may exist currently or be later developed. The electric power pack 28 may include ancillary electrical components such as s, transformers, voltage converters, relays, circuit breakers, and/or sensors. In the illustrated example, the electric power pack 28 includes at least one set of terminals providing a high voltage output (e.g. 82 V) for operating the primary components of the machine 10, such as the drive wheels and mower deck or other powered implement. It also includes another set of terminals providing a low voltage output (e.g. 12 V) for operating the control systems of the machine 10 as well as certain accessories.

The electric power pack 28 is positioned on the cross-members 20 and may be secured by fasteners, clips, latches, or the like (not shown).

The electric power pack 28 is positioned such that some portion of it is located at or below the bottom surfaces 24 of the main frame rails 18. Stated another way, the electric power pack 28 is positioned "between" the main frame rails 18, rather than sitting above or on top of the main frame rails 18.

The machine 10 is equipped with a drive wheel assembly 30, one on each side. Each drive wheel assembly 30 includes an integral drive hub 32 containing an internal electric motor, gear reduction drive, an optional brake (not separately illustrated), a drive wheel 34, and a tire 36 mounted to the drive wheel 34. It is noted that wheels having a ground-engaging surface, and thus not requiring a separate tire, are known in the art. The integral drive hub 32 is physically mounted to the chassis 16 such that the drive wheel 34 can rotate relative to the chassis 16. As will be described in further detail, the machine 10 is configured such that the wheel speed and direction of rotation can be controlled independently for the left- and right-side drive wheel assemblies 30. In the illustrated example, the drive wheel assemblies 30 are located at or near the rear end 14 of the machine 10. Alternatively, the drive wheel assemblies 30 could be located at or near the front end 12 of the machine 10.

The machine 10 is equipped with left- and right-side steer wheel assemblies 38. Each steer wheel assembly 38 includes a pivot assembly 40, a steer wheel 42, and a tire 44 mounted to the steer wheel 42. It is noted that wheels having a ground-engaging surface, and thus not requiring a separate tire, are known in the art. Each steer wheel assembly 38 is mounted to the chassis 16 such that the steer wheel 42 can rotate relative to the chassis 16 as well as pivot freely about an upright (vertical or near-vertical) axis. The steer wheel assemblies 38 function as casters and therefore passively steer the machine 10. As noted above, the principles described herein are also applicable to a non zero-turn mower (not shown) using a conventional steering linkage to pivot (i.e., actively steer) some or all of the wheels.

The machine 10 is equipped with suitable electrical connections, controls, and switching equipment to permit the operator to control the drive functions of the machine 10. In the illustrated example, the machine 10 includes a left drive motor controller 46 and a right drive motor controller 48. Each of these drive motor controllers 46, 48 includes an electrical power connection to the electric power pack 28 as well as connections to operator controls as described below. Each drive motor controller 46, 48 is operable to receive a command signal from an operator control and to provide electrical power to drive its associated drive wheel assembly 30 at the commanded wheel speed and direction.

The machine 10 includes a body 50 or superstructure positioned above the chassis 16. The body 50 functions to enclose the operating components of the machine 10, to provide the mounting structure for controls and accessories of the machine 10, and to provide a desired external appearance.

The body 50 includes a battery cover assembly 52 which encloses the electric power pack 28.

An operator seat 54 is mounted on top of the battery cover assembly 52. The operator seat 54 may be adjustable in one or more directions, may include retractable armrests, and may include a seatbelt or other restraint for the operator. The battery cover assembly 52 and the operator seat 54 collectively define an "operator station" 56 which functions to support the operator in a position with access to machine controls during operation.

A foot deck 58 is mounted to the chassis 16 forward of the battery cover assembly 52. This serves as a support for the operator's feet. As illustrated, it may be provided with a raised tread structure to increase traction and avoid slippage.

A rollover protection system ("ROPS") 60 is mounted to the body 50 just aft of the operator seat 54. This is a hoop-like structure or rollbar which extends above the operator's head in the seated position. This functions to prevent injury to the operator should the machine 10 rollover in operation. In the illustrated example, the rollover protection system 60 can be folded down or removed to permit operations under low-hanging structures or vegetation, or to make the machine 10 more compact for transportation.

The body 50 includes left and right fenders 62, 64 respectively which flank the left and right sides of the operator seat 54. The left fender 62 is topped by a left console 66 and the right fender 64 is topped by a right console 68.

The body 50 carries one or more operator controls within reach of the operator seat 54. The primary operator controls include a pair of steering levers 70, one for the left side and one for the right side. Each steering lever 70 is generally L-shaped and includes a vertical section 72 pivotally mounted to the body 50 near the forward edge of the operator seat 54, and a horizontal section 74 which extends from the top of the vertical section 72 towards the centerline X of the machine 10.

Each steering lever 70 is pivotally mounted such that it can move in a fore-aft direction to control drive wheel speed. More specifically, the steering lever 70 is spring-loaded to a neutral position which commands drive wheel speed to stop and/or apply a brake. Movement in the forward direction away from the neutral position commands forward wheel rotation, with RPM proportional to steering lever deflection. Movement in the rearward direction away from the neutral position commands reverse wheel rotation, with RPM proportional to steering lever deflection.

Each steering lever 70 is further pivotally mounted so that it can move in a lateral direction between an outboard parking position and a inboard use position.

Optionally, the machine 10 may be equipped with parking switches (not illustrated) which are operable to detect if the steering levers 70 are in the outboard position or the inboard position. The parking switches may be configured such that the machine drive wheel assemblies 30 cannot be operated unless both steering levers 70 are pivoted to the inboard position.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the left or right consoles 64, 68.

The outdoor power machine 10 may be used as follows. First, the operator sits in the operator seat 54 and activates the key switch or main power switch. A blade start/stop switch or other switch is used to turn on mowing blades or other powered implement, and the implement is adjust to an operating position, such as a desired cutting height for mowing. The steering levers 70 are moved from the outboard parking position to the inboard use position. The operator then uses the steering levers 70 to drive the outdoor power machine 10 in the desired direction while mowing or other implement operation takes place. It will be understood from the above description that manipulation of the steering levers 70 is sufficient to control forward and aft movement of the outdoor power machine 10, as well as braking and steering.

FIGS. 5-8 illustrate another exemplary embodiment of an outdoor power machine 110. This embodiment of the machine 110 is a stand-on machine (alternatively referred to as a "stander"). The overall construction of the machine 110 is similar to the machine described above. Elements of the machine 110 not explicitly described may be taken to be identical to the machine 110 described above.

The machine 110 has a chassis 116 including main frame rails 118 extending in a longitudinal direction from a front end 112 of the machine 110 to a rear end 114 of the machine 110. Cross-members 120 interconnect the main frame rails 118. A front axle assembly 126 interconnects the main frame rails 118 at the front end 112 of the machine 110.

The machine 110 is equipped with an electric power pack 128 as described above.

The machine is equipped with left- and right-side drive wheel assemblies 130. Each drive wheel assembly 130 includes an integral drive hub 132 containing an electric motor, a gear reduction drive, and an optional brake (not separately illustrated), a drive wheel 134, and a tire 136 mounted to the drive wheel 134. It is noted that wheels having a ground-engaging surface, and thus not requiring a separate tire, are known in the art. In the illustrated example, the drive wheel assemblies 130 are located at or near the rear end 114 of the machine 110. Alternatively, the drive wheel assemblies 130 could be located at or near the front end 112 of the machine 110.

The machine 110 is equipped with left- and right-side steer wheel assemblies 138. Each steer wheel assembly 138 includes a pivot assembly 140, a steer wheel 142, and a tire 144 mounted to the steer wheel 142. It is noted that wheels having a ground-engaging surface, and thus not requiring a separate tire, are known in the art. Each steer wheel assembly 138 is mounted to the chassis 116 such that the steer wheel 142 can rotate relative to the chassis 116 as well as pivot freely about an upright (vertical or near-vertical) axis. The steer wheel assemblies 138 function as casters and therefore passively steer the machine 110. As noted above, the principles described herein are also applicable to a non zero-turn mower (not shown) using a conventional steering linkage to pivot (i.e., actively steer) some or all of the wheels.

The machine 110 is equipped with suitable electrical connections, controls, and switching equipment to permit the operator to control the drive functions of the machine 110. In the illustrated example, the machine 110 includes a left drive motor controller and a right drive motor controller (not visible in these views). Each of these drive motor controllers includes a electrical power connection to the electrical power pack 128 as well as connections to operator controls as described below. Each drive motor controller is operable to receive a command signal from an operator control and to provide electrical power to drive its associated drive wheel assembly 130 at the commanded wheel speed and direction.

The machine 110 includes a body 150 or superstructure positioned above the chassis 116.

The body 150 includes a battery cover assembly 152 which encloses the electric power pack 128. A control pedestal 154 is mounted on top of the battery cover assembly 152.

A foot deck 158 is mounted to the chassis 116 aft of the battery cover assembly 152. This serves as a support for the operator's feet. As illustrated, it may be provided with a raised tread structure to increase traction and avoid slippage. The battery cover assembly 152, the control pedestal 154, and the foot deck 158 collectively define an "operator station" 156 which functions to support the operator to provide access to machine controls during operation.

The body 150 includes left and right fenders 162, 164 respectively which flank the left and right sides of the control pedestal 154. The left fender 162 is topped by a left console 166 and the right fender 164 is topped by a right console 168.

The body 150 carries one or more operator controls within reach of the operator station 156. The primary operator controls include a pair of steering levers 170, one for the left side and one for the right side. Each steering lever 170 is generally L-shaped and includes a vertical section pivotally mounted to the control pedestal 154, and a horizontal section which extends from the top of the vertical section towards the centerline X of the machine 110. Each steering lever 170 is pivotally mounted such that it can move in a fore-aft direction to control drive wheel speed as described above.

Each steering lever 170 is further pivotally mounted so that it can move in a lateral direction between an outboard parking position and a inboard use position. Optionally, the machine 110 may be equipped with parking switches as described above.

Further controls are not separately illustrated but can include one or more of the following: a key switch or other security device; a main power switch; an emergency stop control; a blade start/stop switch; a blade speed control; a drive speed limiter or cruise control; and lighting controls. These further controls may be mounted, for example to the control pedestal 154 or to the left or right consoles 166, 168.

Any of the outdoor power machines described herein may be may be equipped with one or more implements, defined generally as a device attached to or carried by the machine and operable to cut, shape, load, lift, move, or transport material. Nonlimiting examples of implements include mowing decks, plows, disks, scarifiers, rippers, aerators, dethatchers, blades, buckets, scrapers, or blowers.

In the illustrated example, the machine 10 or 110 is equipped with a mowing deck assembly 200 (FIGS. 9-13). It includes a deck 202 extending between left and right sides 204, 206 and having a top panel 208, and a peripheral wall structure including: a front wall 210, left wall 212, right wall 214, and rear wall 216. Collectively, the top panel 208 and the peripheral wall structure define an open-bottomed housing.

The right wall 214 incorporates a side discharge port 218 with front and rear ends 220, 222 respectively. A side discharge chute 224 is mounted to the deck 202 communicating with the side discharge port 218. It is mounted by a spring-loaded pivot bracket 226 which permits it to move between a lowered position (shown) and a raised position (not shown).

The deck 202 has an overall width "W" between left and right sides 204, 206 which may be selected to provide a desired cutting swath. It will be understood that the overall width W is a nominal designated size and does not necessarily describe a precise dimension. In general, the deck configuration described herein is especially useful for decks of at least approximately 48 inches. Non-limiting examples of suitable deck widths include 48 inches, 52 inches, 60 inches, or 72 inches.

One or more mowing blades (designated 228 generally) are rotatably mounted on the underside of the top panel 208. each mowing blade 228 generally includes two or more tips 230 each incorporating a cutting edge 232 and a fin 234 intended to produce a suction effect in operation. In operation, each mowing blade 228 will cut a swath of grass or other plant material equal to its diameter "D" measured between the tips 230. Numerous detail designs of mowing blade are known, and it will be understood that the deck assembly 200 could also be used with blade shapes other than those illustrated, or with articulated blades or with flail cutting devices.

The mowing blades 228 are positioned in a spaced-apart configuration such that their tips 230 will not collide in operation. The mowing blades 228 may be positioned to have some overlap in their cutting swaths so as to prevent un-mowed strips of grass when mowing. The dimensions of the individual mowing blades 228 are selected to provide adequate structural strength at selected operating speed, (e.g. 3600 RPM). Generally, the diameter of the each individual mowing blade 228 can be equal to the deck width W divided by the number of mowing blades 228, with some additional diameter provided to accommodate for swath overlap. For example, a deck 202 having a nominal width of 60 inches could use three mowing blades 228 each having a diameter of approximately 20.5 inches.

In the illustrated example, there is a center mowing blade 228A, a left mowing blade 228B, and a right mowing blade 228C. The center mowing blade 228A is mounted at approximately the midline of the deck 202 in a left-right direction, and also approximately in the middle of the deck

202 in a forward-aft direction. The left mowing blade 228B is mounted to the left of the center mowing blade 228A, and is mounted slightly to the rear of the center mowing blade 228A in a fore-aft direction. The right mowing blade 228C is mounted to the right of the center mowing blade 228A, and is mounted slightly to the rear of the center mowing blade 228A in a fore-aft direction. The mowing blades 228 are positioned such that they have a slight overlap of their cutting swaths in the left-right direction, as indicated by the arrows 236 in FIG. 9.

A baffle assembly comprising a plurality of baffles is mounted to the underside of the top panel 208. A forward baffle 240 is positioned slightly to the rear of the front wall 210 of the deck 202. It is generally continuous from the left side 204 of the deck 202 to the right side 206 of the deck 202. It includes a first section 242 forming a generally circular arc surrounding a portion of the left mowing blade 228B, a second section 244 forming a generally circular arc surrounding a portion of the center mowing blade 228A, and a third section 246 extending generally in a straight line from the second section 244 to the front end 220 of the side discharge port 218.

The forward baffle 240 may be formed in one or more individual pieces. It may be integral to the deck 202, or may be a separate component attached to the deck 202, for example using the illustrated fasteners 248.

A rear baffle 250 is positioned adjacent the rear wall 216 of the deck 202. It includes a first section 252 forming a generally circular arc surrounding a portion of the left mowing blade 228B, a second section 254 forming a generally circular arc surrounding a portion of the center mowing blade 228A, and a third section 256 forming a generally circular arc surrounding a portion of the right mowing blade 228C.

A discharge baffle 258 is mounted to the deck 202 extending in a straight line from the right mowing blade 228C to the rear end 222 of the side discharge port 218.

A right-side controller baffle 260 is mounted to the deck 202 between the rear baffle 250 and the rear wall 216 of the deck 202. This is generally L-shaped with a side face 262 and a bottom face 264. It includes a pair of controller mounting tabs 266.

A left-side controller baffle 268 is mounted to the deck 202 between the rear baffle 250 and the rear wall 216 of the deck 202. This is generally L-shaped with a side face 270 and a bottom face 272. It includes a pair of controller mounting tabs 274.

Collectively, the rear wall 216 of the deck 202, the controller baffles 260, 268 and the rear baffle 216 define a controller compartment 276 which accepts a controller as described below.

A left side mulching baffle 278 is generally Y-shaped and includes a left circular-arc leg 280, a right circular-arc leg 282, and a generally straight stem 284. The left side mulching baffle 278 is removably attached to the deck 202 abutting the forward baffle 240. As used herein the term "removably attached" refers to the ability to be connected or disconnected using ordinary tools without extensive disassembly, cutting, grinding, or the like. In the illustrated example, the left side mulching baffle 278 is removably attached using conventional threaded fasteners 286.

A right side mulching baffle 288 is generally M-shaped and includes a left circular-arc leg 289, a right circular-arc leg 290, and a generally straight stem 292. The right side mulching baffle 288 is removably attached to the deck 202 abutting the forward baffle 240.

The left leg 280 and the stem 284 of the left side mulching baffle 278 cooperate with the first section 242 of the forward baffle 240 and the first section 252 of the rear baffle 250 to form a generally complete circular enclosure around the left mowing blade 228B.

The right leg 290 and the stem 292 of the right side mulching baffle 288 cooperate with the third section 256 of the rear baffle 250 to form a generally complete circular enclosure around the right mowing blade 228C.

The right leg 282 and the stem 284 of the left side mulching baffle 278 cooperate with the left leg 289 and the stem 292 of the right side mulching baffle 288, the second section 244 of the forward baffle 240, and the second section 254 of the rear baffle 250 to form a generally complete circular enclosure around the center mowing blade 228A.

Figure 11:
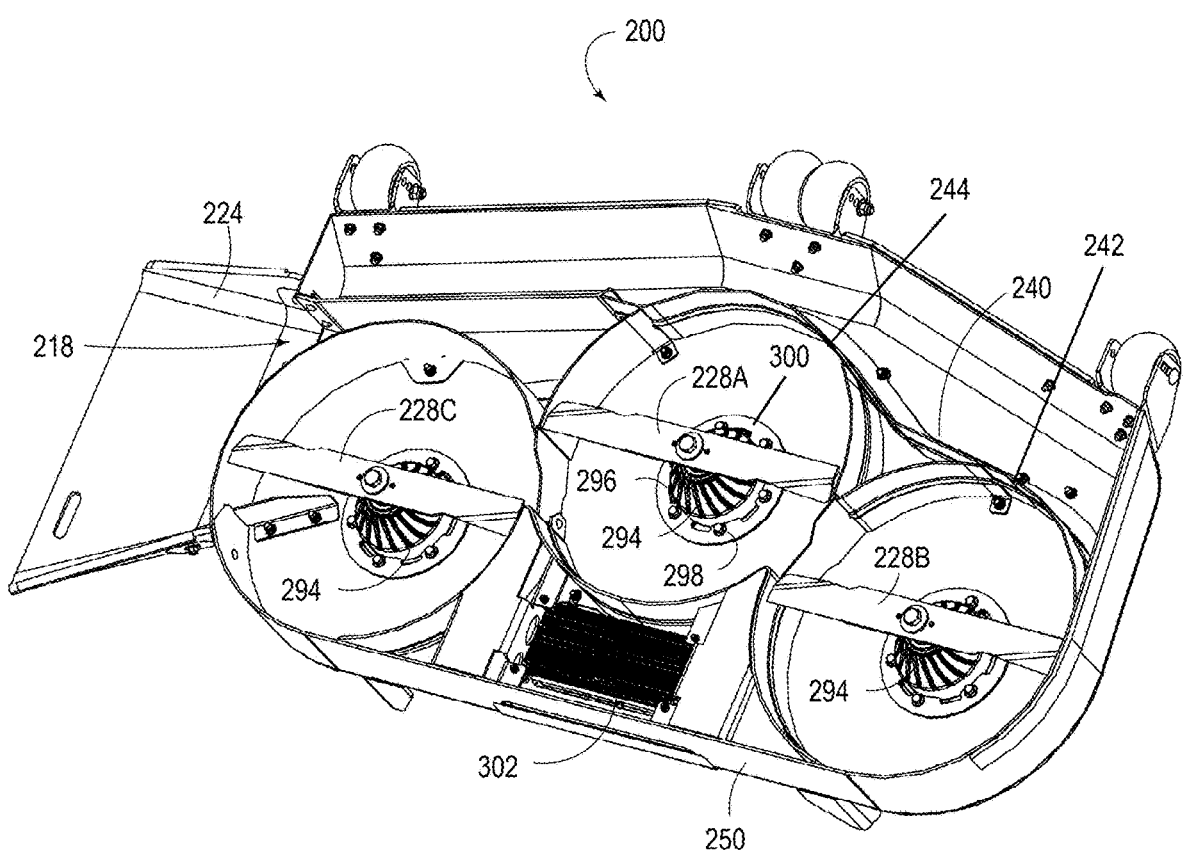
FIG. 11 is a bottom perspective view of the mowing deck assembly of FIG. 9, in a mulching configuration.
Figure 12:
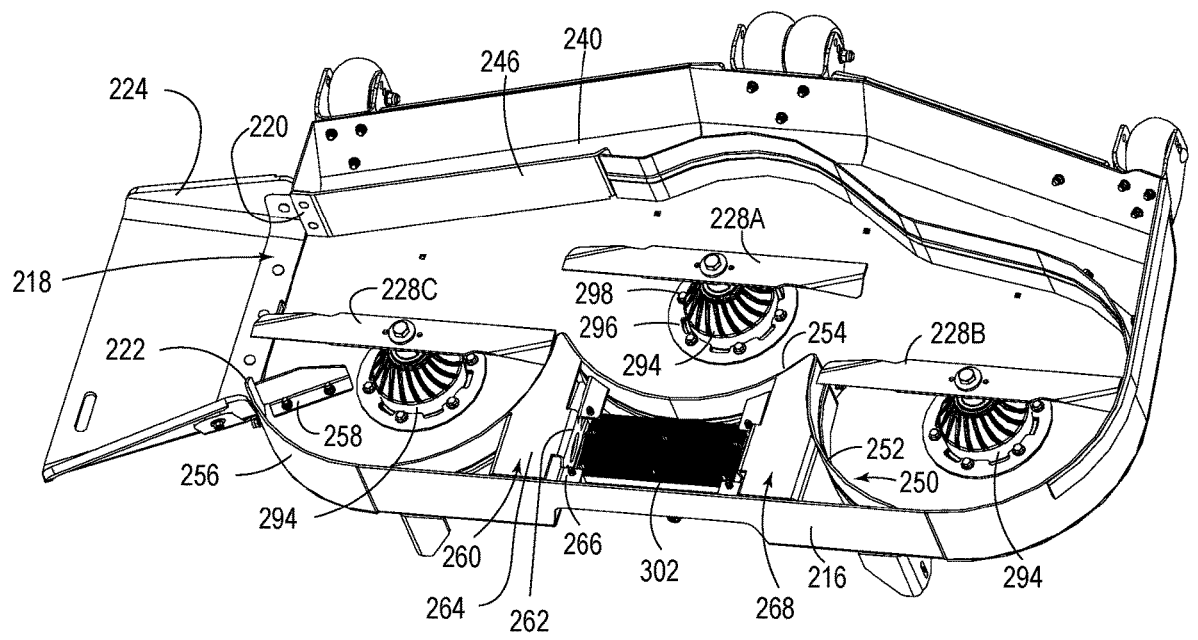
FIG. 12 is a bottom perspective view of the mowing deck assembly of FIG. 9, in a side discharge configuration.
Figure 13:
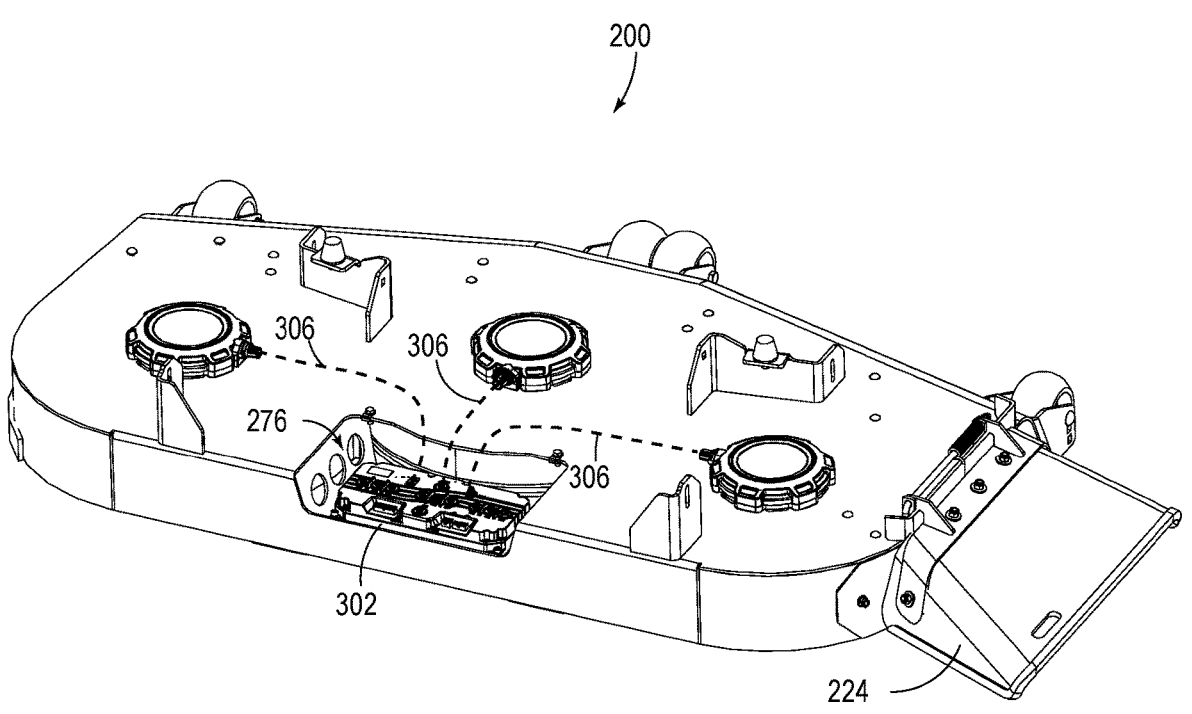
FIG. 13 is a top perspective view of the mowing deck assembly of FIG. 9, with an access cover removed.

In the configuration shown in FIG. 11, the left side mulching baffle 278 and the right side mulching baffle 288 have been removed. The remaining baffles form a flowpath for clippings to pass from the mowing blades 228 to the side discharge port 218.

Means are provided for driving the mowing blades 228. Nonlimiting examples of suitable drive methods include mechanical, hydraulic, or electrical devices. In the illustrated example, each mowing blade 228 is directly driven by its own individual electric blade motor 294. In the illustrated example, each blade motor 294 is a DC brushless 82V motors with a rated output of approximately 1.8 kw.

Each blade motor 294 fits through an individual motor opening 296 in the top panel 208. The blade motor 294 is retained in position using threaded fasteners 298.

The blade motors 294 are configured to provide a large amount of physical clearance above the deck 202. For a given overall motor height, a majority of the blade motor 294 is positioned below the top panel 208. In the illustrated example, at least about 60% of the vertical extent of the blade motor 294 extends below the top panel 208, with the remainder of the blade motor 294 above the top panel 208. This proportion may be controlled by selection of the position of the mounting flange 300 of the motor casing.

The deck 202 is provided with a blade motor controller 302. The blade motor controller 302 is disposed in the controller compartment 276. It is coupled to the controller mounting tabs 266, 274. The controller compartment 276 is covered by an access panel 304 (removed in FIG. 12 to show the blade motor controller 302). The blade motor controller 302 is contained in a fully sealed housing. For example it may have an IP56 rating. The controller compartment 276 is exposed to air to permit the blade motor controller 302 to reject heat in operation. However, the controller compartment 276, including the rear baffle 250 and controller baffles 260, 268 are configured such that the blade motor controller 302 is blocked from a direct line of sight to any of the mowing blades 228. The blade motor controller 302 is thus protected from damage from clippings or foreign objects thrown by the mowing blades 228. The dual functions of protecting the blade motor controller 302 and allowing it to cool are thus achieved without having to provide active cooling.

The blade motor controller 302 has a high voltage (e.g. 82V) electrical connection to the electric power pack 28. It also includes electrical connections to operator controls, such as a blade start-stop switch or speed control switch. These control connections may operates at a lower voltage (e.g. 5v or 12v). The blade motor controller 302 is electrically connected to the individual blade motors 294 by blade motor cables 306 (shown schematically) which connect to the blade motors 294. Each blade motor cable 306 may include one or more conductors carrying DC currents to operate the blade motor 294, as well as one or more conductors carrying low voltage signals, such as motor speed feedback signals.

The blade motor controller 302 is operable to provide electric current to the blade motor 294 and two provide closed-loop speed control of the blade motors 294 based on a motor speed feedback signal. For example, the blade motor controller 302 may include one or more power transistors configured for pulse width modulation (PWM) of the electric current. Suitable motor control electronic configurations are known in the art.

The mowing deck assembly 200 is connected to the chassis via a deck lift. The deck lift is operable to position the mowing blades 228 at a preselected distance above the ground plane G of the machine. Typical examples include a cutting height in the range of approximately 1 inch to approximately 6 inches. The deck lift is also operable to lift the mowing deck assembly 200 well above any intended cutting height so that the machine can traverse obstacles, travel along a road to a worksite, or be loaded or unloaded from a trailer or storage building. This is referred to as a "travel position".

In the example shown in FIGS. 1-4, a deck lift 400 includes a foot pedal 402 to raise the deck lift 400. A removable pin 404 is insertable into a selected hole in a blade height adjuster 406. The position of the pin 404 determines a cutting height by blocking the deck lift 400 at a specific position. An uplock lever 408 is provided to selectively lock and release the deck lift 400 in the travel position.

In the example shown in FIGS. 5-8, the mowing deck assembly 200 is connected to the chassis 116 via a deck lift 410. The deck lift 410 is similar to the deck lift 400 described above, the primary difference being that is operated by a hand lever 412 as opposed to a pedal.

The machine described herein has advantages over prior art machines. The overall deck geometry permits mulching or discharging grass from the deck by simply removing or adding baffles. In either mode of operation, the blade motor controller is protected from damage.

The foregoing has described a mowing deck assembly and an outdoor power machine with a mowing deck. All of the features disclosed in this specification, and/or all of the steps of any method or process so disclosed, may be combined in any combination, except combinations where at least some of such features and/or steps are mutually exclusive.

Each feature disclosed in this specification may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends, or to any novel one, or any novel combination, of the steps of any method or process so disclosed.

What is claimed is:

1. A mowing deck assembly for an outdoor power machine, comprising:
   a mowing deck defining an open-bottomed housing, including a top panel and a peripheral wall structure;
   two or more electric blade motors mounted to the mowing deck;
   two or more mowing blades, each of the two or more mowing blades being coupled to each of the electric blade motor mounted to the deck;

an electronic blade motor controller mounted to the deck and electrically connected to each of the electric blade motors; and a baffle assembly including one or more baffles mounted to an underside of the top panel, wherein the baffle assembly exposes the blade motor controller to air for permitting the blade motor controller to reject heat in operation, but blocks the blade motor controller from a direct line of sight to any of the mowing blades for protecting the blade motor controller from damage.

2. The mowing deck assembly of claim 1, wherein the blade motor controller is electrically connected to the individual blade motors by individual blade motor cables.

3. The mowing deck assembly of claim 1, wherein the blade motor controller is mounted below the top panel.

4. The mowing deck assembly of claim 1, wherein the baffle assembly includes one or more controller baffles which defines a controller compartment positioned below the top panel, wherein the blade motor controller is mounted in the controller compartment.

5. The mowing deck assembly of claim 1 wherein the controller compartment communicates with an access opening in the top panel.

6. The mowing deck assembly of claim 5 wherein the access opening in the top panel is covered by a removeable access panel.

7. The mowing deck assembly of claim 1, wherein the baffle assembly includes:

a forward baffle positioned to the rear of a front wall of the deck;

a rear baffle positioned adjacent a rear wall of the deck;

a discharge baffle mounted to the deck adjacent to a side discharge port of the peripheral wall structure;

a right-side controller baffle mounted to the deck between the rear baffle and the rear wall of the deck;

a left-side controller baffle mounted to the deck between the rear baffle and the rear wall of the deck;

a left side mulching baffle removably attached to the deck, abutting the forward baffle; and a right side mulching baffle removably attached to the deck, abutting the forward baffle.

8. The mowing deck assembly of claim 7, wherein the rear baffle includes a first section forming a generally circular arc, a second section forming a generally circular arc, and a third section forming a generally circular arc.

9. The mowing deck assembly of claim 8, wherein:

the right-side controller baffle is generally L-shaped with a side face and a bottom face;

the left-side controller baffle is generally L-shaped with a side face and a bottom face; and collectively, the rear wall of the deck, the controller baffles, and the rear baffle define a controller compartment that receives the blade motor controller.

10. The mowing deck assembly of claim 1, wherein the two or more electric blade motors include:

a center blade motor mounted at approximately a midline of the deck in a left-right direction, and approximately a middle of the deck in a forward-aft direction;

a left blade motor mounted to the left of the center mowing blade and to the rear of the center blade motor in the fore-aft direction; and a right blade motor mounted to the right of the center mowing blade and to the rear of the center mowing blade in the fore-aft direction.

11. The mowing deck assembly of claim 1, wherein:

the two or more mowing blades are positioned in a spaced-apart configuration such that they will not collide with each other in operation; and each of the two or more mowing blades defines a cutting swath, and the mowing blades are positioned such that their cutting swaths overlap in at least one direction.

12. An outdoor power machine, comprising:

a chassis;

two or more drive wheel assemblies mounted to the chassis, each drive wheel assembly coupled to an electric motor;

an electrical power pack configured to supply electric energy to the electric motors;

two or more steer wheels pivotally mounted to the chassis;

a mowing deck assembly connected to the chassis; the mowing deck assembly including:

a mowing deck defining an open-bottomed housing, including a top panel and a peripheral wall structure;

two or more electric blade motors mounted to the mowing deck;

two or more mowing blades, each of the two or more mowing blades being coupled to each of the electric blade motor mounted to the deck;

an electronic blade motor controller mounted to the deck and electrically connected to each of the electric blade motors; and a baffle assembly including one or more baffles mounted to an underside of the top panel, wherein the baffle assembly exposes the blade motor controller to air for permitting the blade motor controller to reject heat in operation, but blocks the blade motor controller from a direct line of sight to any of the mowing blades for protecting the blade motor controller from damage.

13. The outdoor power machine of claim 12, wherein the blade motor controller is electrically connected to the individual blade motors by individual blade motor cables.

14. The outdoor power machine of claim 12, wherein blade motor controller is mounted below the top panel.

15. The outdoor power machine of claim 12 wherein the controller compartment communicates with an access opening in the top panel; and the access opening in the top panel is covered by a removeable access panel.

16. The outdoor power machine of claim 12, wherein the baffle assembly includes:

a forward baffle positioned to the rear of a front wall of the deck;

a rear baffle positioned adjacent a rear wall of the deck;

a discharge baffle mounted to the deck adjacent to a side discharge port of the peripheral wall structure;

a right-side controller baffle mounted to the deck between the rear baffle and the rear wall of the deck;

a left-side controller baffle mounted to the deck between the rear baffle and the rear wall of the deck;

a left side mulching baffle removably attached to the deck, abutting the forward baffle; and a right side mulching baffle removably attached to the deck, abutting the forward baffle.

17. The outdoor power machine of claim 16, wherein the rear baffle includes a first section forming a generally circular arc, a second section forming a generally circular arc, and a third section forming a generally circular arc.

18. The outdoor power machine of claim 16, wherein:

the right-side controller baffle is generally L-shaped with a side face and a bottom face;

the left-side controller baffle is generally L-shaped with a side face and a bottom face; and collectively, the rear wall of the deck, the controller baffles, and the rear baffle define a controller compartment that receives the blade motor controller.

\* \* \* \* \*